US008739895B2

(12) United States Patent
Hartmann et al.

(10) Patent No.: US 8,739,895 B2
(45) Date of Patent: Jun. 3, 2014

(54) MACHINE TOOL

(75) Inventors: Markus Hartmann, Mauerstetten (DE); Alexander John, Ob Hohenburg (AT)

(73) Assignee: Hilti Aktiengesellschaft, Schaan (LI)

( * ) Notice: Subject to any disclaimer, the term of this patent is extended or adjusted under 35 U.S.C. 154(b) by 556 days.

(21) Appl. No.: 12/800,896

(22) Filed: May 25, 2010

(65) Prior Publication Data

US 2010/0300718 A1 Dec. 2, 2010

(30) Foreign Application Priority Data

May 28, 2009 (DE) ........................ 10 2009 026 542

(51) Int. Cl.

*B23B 45/16* (2006.01)
*B25D 9/00* (2006.01)
*B25D 11/00* (2006.01)
*B25D 13/00* (2006.01)
*B25D 16/00* (2006.01)

(52) U.S. Cl.

USPC .......................................................... 173/201

(58) Field of Classification Search

CPC ............. B25D 17/06; B25D 2250/231; B25D 2250/035; B25D 9/20
USPC ........................................... 173/201, 13–137
See application file for complete search history.

(56) References Cited

U.S. PATENT DOCUMENTS

| | | | | |
|---|---|---|---|---|
| 3,688,848 | A | 9/1972 | Vick et al. | |
| 4,290,489 | A * | 9/1981 | Leavell | 173/17 |
| 4,624,325 | A | 11/1986 | Steiner | 173/139 |
| 6,119,796 | A * | 9/2000 | Schmid | 173/201 |
| 6,237,700 | B1 | 5/2001 | Berger et al. | 173/201 |
| 6,736,292 | B2 * | 5/2004 | Grach et al. | 222/262 |
| 6,799,644 | B2 * | 10/2004 | Hoop et al. | 173/201 |
| 6,889,591 | B2 * | 5/2005 | Sabates et al. | 89/1.14 |
| 7,096,973 | B2 * | 8/2006 | Ikuta et al. | 173/201 |
| 7,252,157 | B2 * | 8/2007 | Aoki | 173/162.2 |
| 7,448,524 | B1 * | 11/2008 | Liang et al. | 227/130 |
| 7,861,799 | B2 * | 1/2011 | Iwakami et al. | 173/201 |
| 8,215,529 | B2 * | 7/2012 | Wu | 227/130 |
| 2007/0284126 | A1 * | 12/2007 | Kirsch | 173/212 |
| 2008/0029566 | A1 * | 2/2008 | Shkolnikov et al. | 227/10 |
| 2008/0296034 | A1 * | 12/2008 | Braun | 173/4 |
| 2008/0313880 | A1 | 12/2008 | Heep et al. | 29/557 |
| 2011/0303429 | A1 * | 12/2011 | Kohlschmied et al. | 173/112 |

FOREIGN PATENT DOCUMENTS

| | | |
|---|---|---|
| DE | 197 262 72 | 7/1999 |
| DE | 198 28 426 A1 | 1/2000 |
| DE | 102 60 710 | 7/2004 |
| EP | 0 014 760 | 9/1980 |

(Continued)

*Primary Examiner* — Robert Long
(74) *Attorney, Agent, or Firm* — Davidson, Davidson & Kappel, LLC

(57) ABSTRACT

The machine tool includes a pneumatic percussion mechanism having a cup-shaped exciter cylinder (21) with an inner chamber (31) which is open in the direction of impact (26), and a free piston (22) which is movable in the inner chamber (31). A recess (32) and at least one ventilation opening (35), spaced at a distance from the recess (32) in the direction of impact (26), are provided in a shell-type wall (39) of the inner chamber (31). The free piston (22) includes a sealing element (53) which seals off the at least one ventilation opening (35) when the sealing element (53) is oppositely situated from the at least one ventilation opening (35), and which in the region of the recess (32) is separated at a distance from the shell-type wall (39) when the sealing element (53) is oppositely situated from the recess.

17 Claims, 2 Drawing Sheets

(56) References Cited

FOREIGN PATENT DOCUMENTS

| | | |
|---|---|---|
| EP | 1 825 963 | 8/2007 |
| EP | 2 163 355 | 3/2010 |
| GB | 1 424 473 | 2/1976 |
| WO | WO2004060615 | 7/2004 |

* cited by examiner

MACHINE TOOL

This claims the benefit of German Patent Application DE 10 2009 026 542.2, May 28, 2009 and hereby incorporated by reference herein.

The present invention relates to a machine tool for chiseling and optionally for drilling, in particular a hand-held machine tool.

BACKGROUND

A motor-driven pneumatic percussion mechanism in a hand-held machine tool is intended to provide a chiseling effect as soon as possible after being placed on a workpiece. When the tool is lifted from the workpiece the blows from the percussion mechanism are dissipated, and the energy of the blows is transmitted into damping elements and a housing of the hand-held machine tool. The resulting increased stress on the hand-held machine tool and the user should be avoided by switching off the pneumatic percussion mechanism.

DE 198 28 426 A1 describes a system for switching off a pneumatic percussion mechanism after a blank blow. Multiple ventilation holes are provided in a cup-shaped exciter cylinder, parallel to the impact axis. The ventilation openings are closed or opened to the inside by a free piston, and are closed or opened to the outside by a guide tube, depending on the relative position of the free piston and the guide tube. Slots which are longer than the free piston are provided in the exciter cylinder, parallel to the ventilation openings, to compensate for air losses in the pneumatic chamber.

SUMMARY OF THE INVENTION

It is an object of the present invention to provide a pneumatic percussion mechanism having a cup-shaped exciter cylinder requires a highly accurate fit of elements, i.e., the guide tube, exciter cylinder, and free piston, which move inside one another to ensure a largely airtight closure via the adjoining walls of the particular elements. For this purpose the elements must have sufficient mechanical stability, in particular during the percussive operation.

Another object of the present invention is to provide a pneumatic percussion mechanism having improved mechanical stability which allows the percussion mechanism to be reliably switched on and off.

The present invention provides a machine tool including a pneumatic percussion mechanism having a cup-shaped exciter cylinder with an inner chamber which is open in the direction of impact, and a free piston which is movable in the inner chamber. A recess and at least one ventilation opening, spaced at a distance from the recess in the direction of impact, are provided in a shell-type wall of the inner chamber. The free piston includes a sealing element which seals off the at least one ventilation opening when the sealing element is oppositely situated from the at least one ventilation opening, and which in the region of the recess is separated at a distance from the shell-type wall when the sealing element is oppositely situated from the recess.

The sealing element can seal off a pneumatic chamber between the free piston and the exciter cylinder. For this purpose the sealing element contacts the shell-type wall of the inner chamber. The recess allows ventilation to compensate for air losses from the pneumatic chamber due to the fact that air is able to flow past a free piston in the region of the recesses during the period of time that the sealing element is oppositely situated from the recess. Parasitic ventilation, when the sealing element passes the ventilation openings, is prevented by designing the sealing element to seal off the ventilation openings.

The recess may have a depth which, in contrast to the ventilation openings, is less than a wall thickness of the exciter cylinder. The recess thus allows air flow only along the direction of impact. The ventilation openings are designed to allow air flow in a radial direction essentially perpendicular to the direction of impact.

One embodiment provides that a dimension of the recess is greater than a dimension of the at least one ventilation opening. The dimensions, i.e., the width, are specified in each case along the direction of impact. The width of the recess may be selected, for example, to be twice the width of the ventilation opening.

One embodiment provides that the recess has an annular shape. An annular recess results in an axially symmetrical weakening. It has been shown that forces acting on the exciter cylinder are thus advantageously able to cause only a slight change in the shape and accuracy of fit of the exciter cylinder.

One embodiment provides that at least three of the ventilation openings are situated in a plane perpendicular to the direction of impact, although at least four or even at least eight may be preferable. The ventilation openings may be provided in a uniform angular distribution around an axis of the percussion mechanism to allow a more dimensionally stable design. The ventilation openings may also be situated in a plane or in a spiral.

One embodiment provides that a drive is provided for periodically moving the exciter cylinder by one stroke height along the direction of impact, and that a distance of the recess from the at least one ventilation opening is less than one-half the stroke height. The pneumatic chamber may already be directly ventilated during a blank blow. The exciter cylinder is typically still in its far-advanced position in the direction of impact, and the free piston is advanced beyond the normal point of impact.

One embodiment provides that the movable free piston has an air channel for connecting oppositely situated sides of the free piston in the direction of impact, the air channel being interrupted by the sealing element.

One embodiment provides that the machine tool has a guide tube within which the exciter cylinder is movably situated, the guide tube having an outlet opening with a front edge in the direction of impact, and during a blank blow the sealing element being situated behind the front edge in the direction of impact, and in the impact position being situated in front of the front edge. Air flow through the ventilation opening may be designed as a function of the position of the free piston relative to a guide tube. The opening and closing as a function of the relative position may be used in particular for targeted ventilation after a blank blow, or for starting the pneumatic percussion mechanism.

BRIEF DESCRIPTION OF THE DRAWINGS

The following description explains the present invention with reference to exemplary embodiments and the figures.

Identical or functionally equivalent elements are indicated in the figures by the same reference numerals unless stated otherwise.

DETAILED DESCRIPTION OF THE INVENTION

Figure 1:
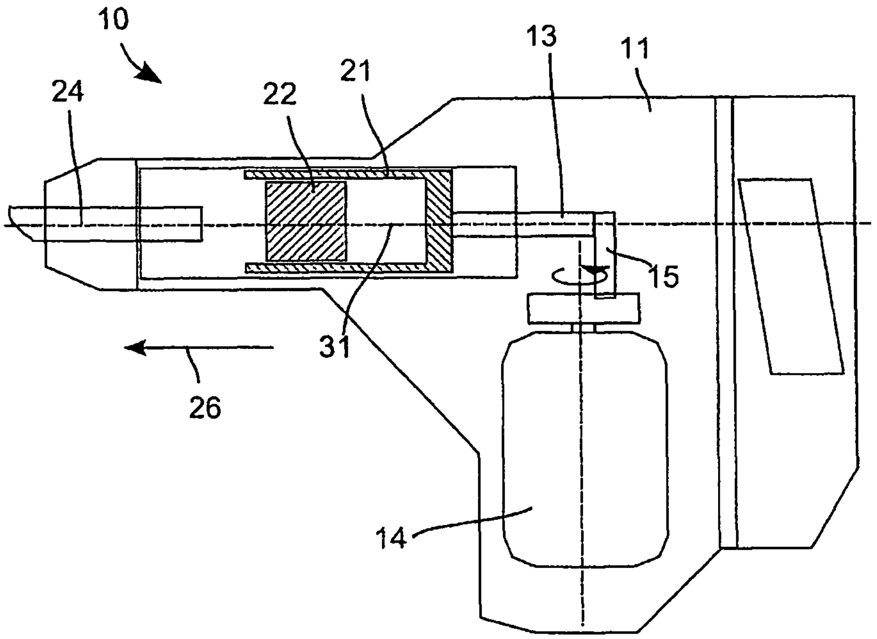
FIG. 1 shows a hand-held machine tool.

FIG. 1 shows an example of a machine tool 10 which is designed for percussive operation and is optionally also designed for rotary operation. Machine tool 10 is preferably a hand-held machine tool which may be held by a user, using one hand or two hands. Machine tool 10 may optionally be guided with the aid of a pilot.

A pneumatic percussion mechanism 12, a drive train 13, and a motor 14, preferably an electric motor, are situated within a machine housing 11 of machine tool 10. Drive train 13 converts a rotary motion of motor 14 to a linear motion for actuating percussion mechanism 12. For this purpose, drive train 13 may include an eccentric 15 or a wobble drive, for example.

Figure 2:
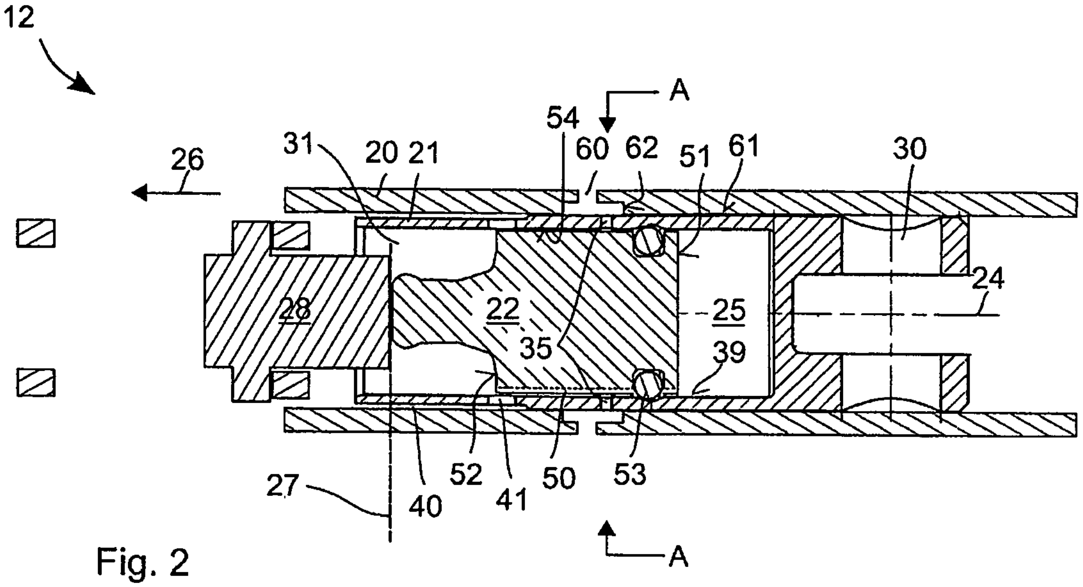
FIG. 2 shows a pneumatic percussion mechanism in the impact position.
Figure 3:
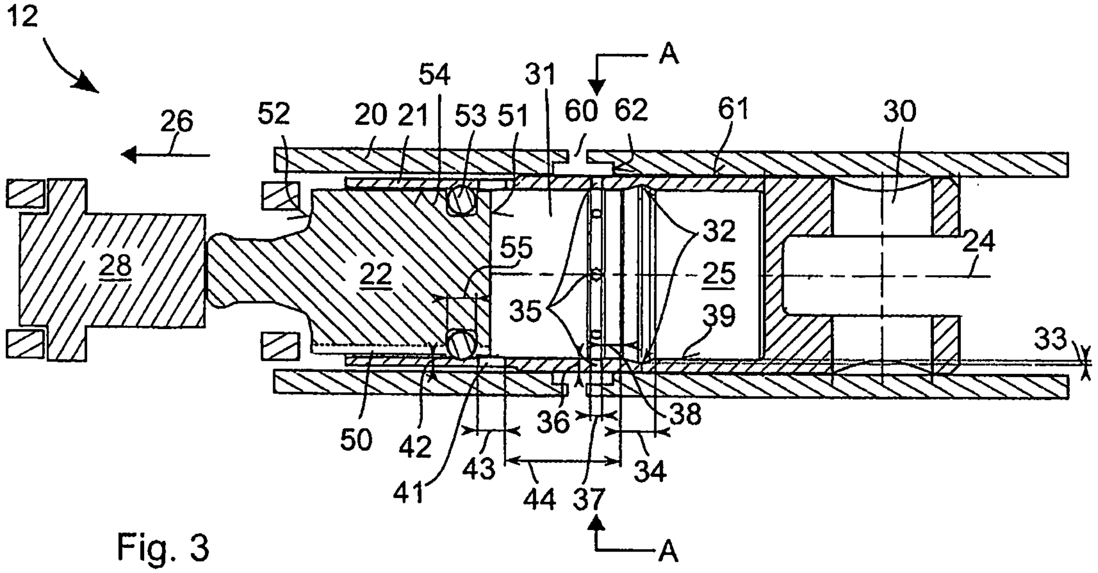
FIG. 3 shows the pneumatic percussion mechanism during a blank blow.

One embodiment of pneumatic percussion mechanism 12 is illustrated in a partial section in FIG. 2 and FIG. 3. An exciter cylinder 21 is movably situated inside a guide tube 20, and a free piston 22 is movably situated inside the exciter cylinder. Exciter cylinder 21 is forced by drive train 13 into a periodic linear motion along an impact axis 24. Free piston 22 is linked to the periodic motion of exciter cylinder 21 via a pneumatic chamber 25 which is closed off by free piston 22 and exciter cylinder 21. As a result, free piston 22 is periodically accelerated in direction of impact 26, and in percussive operation strikes an impact surface 27 which, depending on the design of machine tool 10, is defined by an inserted tool or, as illustrated, by a snap die 28.

Exciter cylinder 21 has an articulated joint 30 at a front end in direction of impact 26 for connecting to drive train 13.

Exciter cylinder 21 has a cup-like shape. An inner chamber 31 of exciter cylinder 21 is open in direction of impact 26. Inner chamber 31 has a cylindrical shape with a cross section, preferably a circular cross section, which is uniform along direction of impact 26.

A recess 32 is provided in shell-type wall 39 of inner chamber 31. The cross section of inner chamber 31 is enlarged by a depth 33 in the region of recess 32. In one embodiment, recess 32 may annularly span entire inner chamber 31. Recess 32 is situated in a plane perpendicular to direction of impact 26. Recess 32 has a width 34, i.e., a dimension along direction of impact 26, which is selected as a function of the design of free piston 22.

Figure 4:
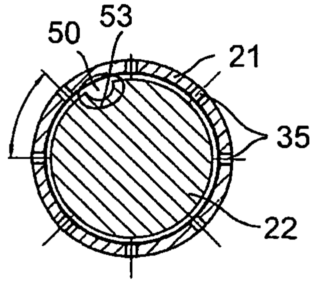
FIG. 4 shows a cross section through the exciter cylinder and the free piston situated therein.

Multiple, at least three, for example at least four or at least six, ventilation openings 35 are provided in exciter cylinder 21 in a plane A-A situated parallel to recess 32 and behind recess 32 in direction of impact 26. FIG. 4 shows a cross section through exciter cylinder 21 in plane A-A. Ventilation openings 35 extend from inner chamber 31 to guide tube 20. A depth 36 of ventilation openings 35 corresponds to the distance of inner chamber 31 from guide tube 20. Ventilation openings 35 are preferably closed over their entire depth 36 in direction of impact 26. A width 37, i.e., a dimension along direction of impact 26, of ventilation openings 35 is less than width 34 of recess 32, and is preferably less than one-half of width 34 of recess 32.

In one embodiment not illustrated, ventilation openings 35 may be provided in multiple parallel planes. At least three, for example at least four or at least six, ventilation openings 35 are preferably provided in each of the planes. The parallel planes are separated in direction of impact 26 at a distance from one another at least by width 37 of ventilation openings 35, preferably by twice width 37 of the ventilation openings.

A distance 38 between recess 32 and ventilation openings 35 is selected as a function of the forced motion of exciter cylinder 21. Exciter cylinder 21 is moved by drive train 13 along direction of impact 26 with a maximum deflection of one stroke height. Distance 38 is less than one-half of the stroke height, preferably less than 30% of the stroke height.

Free piston 22 has an essentially cylindrical shape which is adapted to inner chamber 31 of exciter cylinder 21. An outer cross section of free piston 22 is only slightly less than a cross section of inner chamber 31, so that free piston 22 is guided within exciter cylinder 21 in a sliding, largely airtight manner.

A channel 50 is provided in free piston 22 which connects a front face 51 in direction of impact 26 with a rear face 52 of free piston 22 in direction of impact 26. As illustrated, channel 50 may be designed in the shape of a longitudinal groove or a borehole. A sealing element 53, for example a seal ring, interrupts channel 50. Sealing element 53 is situated on an outer surface 54 of free piston 22. In the embodiment illustrated, the seal ring spans the circumference of free piston 22.

A width 55 and other dimensions of sealing element 53 are selected in such a way that sealing element 53 does not contact recess 32. Width 34 of recess 32 may be, for example, twenty to thirty percent greater than width 55 of sealing element 53. When free piston 22 during its motion assumes a position in which its sealing element 53 and recess 32 are oppositely situated, i.e., situated in a plane, air is able to flow around sealing element 53. Sealing element 53 and recess 32 form a valve unit which allows ventilation of pneumatic chamber 25 as a function of the position of free piston 22 within exciter cylinder 21. Recess 32 and sealing element 53 are preferably situated in such a way that ventilation of pneumatic chamber 25 occurs just before and/or after free piston 22 strikes impact surface 27 during percussive operation (impact position). FIG. 2 shows the impact position for percussion mechanism 12 as an example. The term “just before and/or after” refers to a period of time which is preferably less than 5% of a time period between two impacts.

Width 55 of sealing element 53 is also designed in such a way that sealing element 53 seals off ventilation opening 35 which is momentarily oppositely situated from sealing element 53, i.e., when sealing element 53 and ventilation opening 35 are situated in a plane. Width 37 of ventilation opening 35 may be, for example, less than 75% of width 55 of sealing element 53.

Guide tube 20 has an inner cross section which is adapted to the outer cross section of exciter cylinder 21 in such a way that a largely airtight, sliding motion of exciter cylinder 21 within guide tube 20 is ensured.

Exciter cylinder 21 is adapted to guide tube 20 in an airtight manner, in particular in the region of ventilation openings 35.

An outlet opening 60 is provided in the wall of guide tube 20. Outlet opening 60 may, as illustrated, be designed as a borehole, or as a slot along an inner wall 61 which is open in direction of impact 26. Outlet opening 60 has a front edge 62 in direction of impact 26. The position of front edge 62 is selected in such a way that in the impact position, sealing element 53 is in front of front edge 62 in the direction of impact. Sealing element 53 prevents air flow through outlet opening 60 into pneumatic chamber 26, regardless of the position of exciter cylinder 21. Front edge 62 preferably adjoins sealing element 53 in the impact position.

FIG. 3 shows a free piston during a blank blow. When machine tool 10 is lifted from a workpiece to be machined, the tool is no longer pressed against direction of impact 26. Impact surface 27 is displaced in direction of impact 26, from the impact position to the blank blow position. The energy transmitted from free piston 23 to the tool or the snap die is not supplied to the workpiece, but instead is dissipated in damping elements of machine tool 10.

In a position between the impact position and the blank blow position, free piston 22 is advanced until sealing element 53 is situated behind front edge 62 in the direction of impact. Air is able to flow through outlet opening 60 into pneumatic chamber 25 due to ventilation openings 35.

In the embodiment illustrated, an outer cross section of exciter cylinder 21 at its rear end in direction of impact 26 is smaller than an inner cross section of guide tube 20. A gap 40 which is open in direction of impact 26 is situated between exciter cylinder 21 and guide tube 20. An additional ventilation opening 41 may connect gap 40 to inner chamber 31 of exciter cylinder 21. Additional ventilation opening 41 correspondingly has a smaller depth 42 than first-referenced ventilation openings 35. A width 43 of additional ventilation opening 41 is selected as a function of the design of free piston 22. For example, width 43 may be selected to be equal to width 34 of recess 32, or at least twice the width 37 of first-referenced ventilation openings 35. A distance 44 of additional ventilation opening 41 from recess 32 is greater than one-half the stroke height.

The invention claimed is:

1. A machine tool for impacting a work piece comprises:

a pneumatic percussion mechanism having a cup-shaped exciter cylinder with an inner chamber open in a direction of impact, the inner chamber being defined, at least partially, by a shell-type wall, the shell type-wall having at least one ventilation opening and a recess, the at least one ventilation opening spaced at a distance from the recess in the direction of impact; and a free piston movable in the inner chamber, the free piston including a sealing element located in the inner chamber and contacting an inner surface of the shell-type wall, the sealing element sealing off the at least one ventilation opening when the sealing element is oppositely situated from the at least one ventilation opening, the sealing element, when in the region of the recess, being separated at a distance from the shell-type wall when the sealing element is oppositely situated from the recess.

2. The machine tool as recited in claim 1 wherein a width of the recess is greater than a width of the ventilation openings.

3. The machine tool as recited in claim 1 wherein the recess has an annular shape.

4. The machine tool as recited in claim 1 wherein at least three of the ventilation openings are situated in a plane perpendicular to the direction of impact.

5. The machine tool as recited in claim 1 wherein the ventilation openings are provided in a uniform angular distribution around an axis of the percussion mechanism.

6. The machine tool as recited in claim 5 wherein the ventilation openings are situated in a spiral around the axis.

7. The machine tool as recited in claim 1 wherein further comprising a drive for periodically moving the exciter cylinder by one stroke height along the direction of impact, and a distance of the recess from the at least one ventilation opening is less than one-half the stroke height.

8. The machine tool as recited in claim 7 wherein the distance of the recess from the at least one ventilation opening is less than thirty percent of the stroke height.

9. The machine tool as recited in claim 1 wherein the movable free piston has an air channel for connecting oppositely situated sides of the free piston in the direction of impact, the air channel being interrupted by the sealing element.

10. The machine tool as recited in claim 1 further comprising a guide tube within which the exciter cylinder is movably situated, the guide tube having an outlet opening with a front edge in the direction of impact, and during a blank blow the sealing element being situated behind the front edge in the direction of impact, and in the impact position being situated in front of the front edge.

11. The machine tool as recited in claim 10 wherein the exciter cylinder has at at least one location an outer cross section forming an airtight seal with an inner cross section of the guide tube.

12. The machine tool as recited in claim 1 further comprising a drive mechanically connected to the exciter cylinder.

13. The machine tool as recited in claim 12 wherein the exciter cylinder has an articulated joint connected to the drive.

14. The machine tool as recited in claim 12 wherein the drive drives the exciter cylinder in a periodic linear motion.

15. The machine tool as recited in claim 1 wherein the piston has at at least one location an outer cross section forming an airtight seal with an inner cross section of the shell-type wall.

16. A machine tool for impacting a work piece comprising:

a drive;

a pneumatic percussion mechanism having a cup-shaped exciter cylinder driven by the drive and having a shell-type wall defining at least partially an inner chamber open in a direction of impact, the shell type-wall having at least one ventilation opening and a recess, the at least one ventilation opening spaced at a distance from the recess in the direction of impact; and a free piston movable in the inner chamber, the free piston including a sealing element sealing off the at least one ventilation opening when the sealing element is oppositely situated from the at least one ventilation opening, the sealing element, when in the region of the recess, being separated at a distance from the shell-type wall when the sealing element is oppositely situated from the recess.

17. A machine tool for impacting a work piece comprises:

a pneumatic percussion mechanism having a cup-shaped exciter cylinder with an inner chamber open in a direction of impact, the inner chamber being defined, at least partially, by a shell-type wall, the shell type-wall having at least one ventilation opening and a recess, the at least one ventilation opening spaced at a distance from the recess in the direction of impact; and a free piston movable in the inner chamber, the free piston including a sealing element sealing off the at least one ventilation opening when the sealing element is oppositely situated from the at least one ventilation opening, the sealing element, when in the region of the recess, being separated at a distance from the shell-type wall when the sealing element is oppositely situated from the recess;

wherein the movable free piston has an air channel for connecting oppositely situated sides of the free piston in the direction of impact, the air channel being interrupted by the sealing element.

* * * * *